United States Patent [19]

Johnson et al.

[11] 4,251,340

[45] Feb. 17, 1981

[54] TERPOLYMERIZATION OF ETHYLENE, SULFUR DIOXIDE AND CARBON MONOXIDE

[75] Inventors: Richard Johnson, Shirley; Meyer Steinberg, Huntington Station, both of N.Y.

[73] Assignee: The United States of America as represented by the United States Department of Energy, Washington, D.C.

[21] Appl. No.: 26,508

[22] Filed: Apr. 3, 1979

[51] Int. Cl.$^3$ .............................................. C08F 2/46
[52] U.S. Cl. ........................... 204/159.11; 204/159.22; 528/382; 528/386; 528/392
[58] Field of Search ...................... 204/159.22, 159.11; 528/386, 382

[56] References Cited

U.S. PATENT DOCUMENTS

| 2,634,254 | 4/1953 | Lipscomb | 528/386 |
| 3,058,899 | 10/1962 | Yanko et al. | 204/159.22 |

*Primary Examiner*—Harold D. Anderson
*Attorney, Agent, or Firm*—James E. Denny; Dean E. Carlson; Leonard Belkin

[57] ABSTRACT

This invention relates to a high molecular weight terpolymer of ethylene, sulfur dioxide and carbon monoxide stable to 280° C. and containing as little as 36 mol % ethylene and about 41–51 mol % sulfur dioxide; and to the method of producing said terpolymer by irradiation of a liquid and gaseous mixture of ethylene, sulfur dioxide and carbon monoxide by means of Co-60 gamma rays or an electron beam, at a temperature of about 10°–50° C., and at a pressure of about 140 to 680 atmospheres, to initiate polymerization.

8 Claims, No Drawings

TERPOLYMERIZATION OF ETHYLENE, SULFUR DIOXIDE AND CARBON MONOXIDE

BACKGROUND OF THE INVENTION

This invention was made under, or during the course of, a contract with the U.S. Department of Energy.

This invention relates to a high molecular weight terpolymer of ethylene, sulfur dioxide and carbon monoxide having good durability and structural properties, produced by the irradiation of a mixture of ethylene, $SO_2$ and CO, having particular utility as a low cost substitute polymer for polyethylene, and as a means of environmental control by removing $SO_2$ from fossil fueled power plant stacks and from metallurgical smelting plants.

The substitution and introduction of CO and $SO_2$ into high molecular weight polymers of ethylene for the purpose of conserving ethylene feedstock for the polymer market has been productive of a new class of terpolymers of CO, $SO_2$ and ethylene, with a content as low as 36 mol percent ethylene and 64 mol percent of combined CO and $SO_2$. These terpolymers are stable up to temperatures of about 280° C. and have good tensile strength.

The preparation of said terpolymers by radiation induced means, in accordance with instant invention, can have very significant application for energy conservation by virtue of the low temperature utilized for the polymerization reaction and the post-irradiation polymerization effect; as a substitute polyethylene low cost polymer since said terpolymer could contain as much as 62 mol% $SO_2$; as a new use for waste $SO_2$ from power plants and ore smelters; and as a means of environmental control by removing $SO_2$ from fossil fueled power plant stacks and from metallurgical smelting plants.

Accordingly, it is a primary object of instant invention to provide for a terpolymer of ethylene, carbon monoxide and sulfur dioxide having a low ethylene content and a high sulfur dioxide content, stable up to a temperature of about 280° C.

Another object of instant invention is to provide for a terpolymer produced by irradiation to initiate polymerization.

Still another object of instant invention is to provide high molecular weight terpolymers with good durability and structural properties, having particular utility in the plastics market.

A further object of instant invention is to provide an ethylene-CO-$SO_2$ terpolymer useful in industry as a means of substituting low-cost and energy conservative materials in the ethylene polymer and copolymer market.

Accordingly, instant invention relates to a high molecular weight terpolymer of ethylene, carbon monoxide and sulfur dioxide containing as little as 36 mol% ethylene and a substantially large amount of $SO_2$, more specifically, about 41-51 mol%; and to the method of producing said terpolymer by irradiation of a liquid and gaseous mixture of ethylene, CO and $SO_2$ at a relatively low temperature of about 10°-50° C., preferably 10°-20° C. and most preferably 10°-13° C. to induce or initiate polymerization and thereafter to allow the polymerization to proceed to its conclusion outside the radiation field.

SUMMARY OF THE INVENTION

This invention relates to high molecular weight solid terpolymer of ethylene, sulfur dioxide and carbon monoxide, stable to 280° C., containing as little as 36 mol% ethylene units and about 41-51 mol% sulfur dioxide units, prepared by the irradiation of a liquid and gaseous mixture of ethylene, carbon monoxide and sulfur dioxide, at a temperature of about 10°-50° C., to initiate polymerization, and allowing the polymerization to proceed to its conclusion outside said radiation field. A method of preparing said ethylene/sulfur dioxide/carbon dioxide solid terpolymer comprises subjecting a liquid and gaseous mixture of said components to irradiation by means of Cobalt-60 gamma rays or an electron beam, at a temperature of about 10°-50° C., and at a pressure of about 140-680 atmospheres, for a period of about 5 minutes to 3 hours, in an environment substantially free of contaminants, to initiate and complete polymerization. A radiation dose of about 0.05 to 3.2 megarads at a radiation intensity rate of about 0.6 to 6.4 megarads per hour is utilized. More specifically, said mixture is subjected to a total radiation dose of about 0.05 to 0.5 megarads for a period of about 5 minutes to ½ hour, at a radiation intensity rate of 0.6–0.9 megarads per hour. When utilizing irradiation with Co-60 gamma rays, it is preferably conducted at a temperature of 10°-13° C.; and when utilizing electron beam irradiation, it is preferably conducted at a temperature of 10°-20° C. A particular terpolymer prepared in accordance with this invention consists of the polymerization product of 36 mol% ethylene, 42 mol% sulfur dioxide and 22 mol% carbon monoxide.

PRIOR ART

The prior art discloses in U.S. Pat. No. 2,634,254 to Lipscomb, a terpolymer of ethylene, $SO_2$ and CO containing 0.05-17 mol% $SO_2$, 0.05-39 mol% CO and 99.9-44 mol% ethylene prepared by polymerizing with a free radical generating catalyst, such as an azo catalyst, in a solvent carrier such as water, benzene, etc., in a pressure reactor with heat and agitation.

The use of radiation to induce polymerization of monomers such as ethylene per se, in the presence of water, is disclosed in U.S. Pat. No. 3,018,236 to Shewmaker et al; and in the presence of pure hydrogen, is disclosed in U.S. Pat. No. 2,964,458 to Minassian. In addition, U.S. Pat. No. 3,058,899 to Yanko et al discloses Cobalt-60 radiation at high pressure and temperatures above 90° C. to polymerize, in the presence of oxygen or water, ethylenically unsaturated compounds including ethylene; CO, $SO_2$ and acetylene being copolymerizable with ethylene.

Kagiya et al, U.S. Pat. No. 3,516,912, discloses radiation polymerization of ethylene per se or with any other monomer such as carbon monoxide, by using carbon dioxide as a reaction medium; U.S. Pat. No. 3,531,389 discloses a two stage radiation (a high dose rate followed by a low dose rate) polymerization of ethylene using carbon dioxide as a reaction medium; U.S. Pat. No. 3,663,391 discloses a chlorofluorinated hydrocarbon solvent for the solution polymerization of ethylene by irradiation with alpha rays, beta rays, gamma rays, x-rays or electron beam.

The use of radiation in polymerization is also disclosed in U.S. Pat. No. 3,792,026 to Atkins et al in a process for the aqueous suspension polymerization of sulfur dioxide with a $C_{10}$-$C_{20}$ alpha monoolefin; in U.S.

Pat. No. 3,943,045 to Cordrey et al in the production of a hydrophilic copolymer in an environment free from a chemical initiator; in U.S. Pat. No. 3,386,972 to Gardner et al in the production of a copolymer of sulfur dioxide and an allylthiourea.

Although the prior art discloses the use of irradiation with Cobalt-60 gamma rays or an electron beam, as a means of polymerizing monomers such as ethylene, in a reaction medium such as oxygen, carbon dioxide, water, hydrogen, and chlorofluorinated hydrocarbon; and the prior art also discloses a terpolymer of ethylene, $SO_2$ and CO containing a minimal amount of $SO_2$ and a major amount of ethylene prepared by the polymerization with a chemical catalyst; the irradiation of a liquid and gaseous mixture of ethylene, $SO_2$ and CO, at a relatively low temperature, in the absence of a reaction medium and/or chemical catalyst, to initiate polymerization which is completed outside said radiation field, to produce high yields of a terpolymer containing a major amount of $SO_2$ and as little as 36 mol% ethylene, is not disclosed. The terpolymers are of a high molecular weight, are stable up to a temperature of about 280° C. and possess good durability and structural properties. Thermal catalytic means give much lower yields of terpolymer and the characteristics of the polymer are not as good as with radiation induced polymerization methods.

DESCRIPTION OF THE INVENTION

The high molecular weight terpolymer, according to this invention consists essentially of as low as 36 mol% ethylene and 64 mol% of combined sulfur dioxide and CO, with the $SO_2$ content being as much as 62 mol%, stable up to a temperature of about 280° C.

More specifically, the terpolymer which is a white solid consists essentially of about 41-62 mol% $SO_2$ and most preferably about 41-51 mol% $SO_2$, about 22-1.9 mol% CO and about 36-49 mol% ethylene.

The process of producing the terpolymer of ethylene, sulfur dioxide and carbon monoxide generally comprises irradiation of a liquid and gaseous mixture of the above pure components to induce polymerization and allowing the polymerization to proceed to its conclusion outside the radiation field. The mechanism of formation of the terpolymer is first by a free radical formation, second by a propagation step and completed by a termination step. Either Co-60 gamma, or electron machine radiation can be employed to produce the free radicals in the liquid and gaseous reaction mixture. The free radicals propagate the polymerization reaction which lasts long enough to produce a high yield of terpolymer without the need for the initial radiation field. The polymerization is preferably formed at relatively low temperatures (10° to 50° C.) so as to form a high molecular weight terpolymer with good durability and structural properties, so that it can be of use in the plastics market. This process is also useful as a means of environmental control by removing $SO_2$ from fossil fueled power plant stacks and/or metallurgical smelting plants.

More specifically, the method of producing terpolymers of ethylene, sulfur dioxide and carbon monoxide, in accordance with instant invention, comprises subjecting a mixture of above components to irradiation by means of Cobalt-60 gamma rays or an electron beam, at a temperature of about 10°-50° C. and preferably 10°-20° C. and most preferably 10°-13° C. and under a pressure of about 140-680 atmospheres and in an environment substantially free of contaminants, for a period of about 5 minutes to 3 hours. Oxygen, as an impurity, is known to be an inhibitor in free radical initiated polymerizations and should be avoided. The mixture of components is subjected to a dose of about 0.05 to 3.20 megarads and at an intensity rate of about 0.6 to 6.4 megarads/hour, with the higher dose and intensity rate coming from the electron beam source.

More specifically, the $SO_2$ component is transferred as a gas at low pressure to the reaction vessel, which is generally made of stainless steel tubing measuring ¼ to ¾ inch outer diameter by 13 inches long, 10½ inches of which extends directly in the radiation field, or may be a thick walled 2 inch outer diameter by 1 inch inner diameter by 11 inches long Inconel vessel; and is then condensed into the chilled reaction vessel. From the known pressure, volume, and temperature of the transfer system, the quantity of $SO_2$ collected in the reaction system is calculated. The vessel containing this known quantity of $SO_2$ is then charged with an ethylene-CO mixture to the desired pressure by means of a compressor. The reaction vessel is submerged in a Cobalt-60 gamma pool maintained preferably at a temperature of 10°-13° C.

Large overall pressure drops are observed because of high polymerization rates and the volume reduction resulting from the polymerization reaction. However, a pressure increase is observed during the initial part of the irradiation period due to a rise in temperature caused by a large exotherm resulting from the high rate of polymerization.

A strong post irradiation effect, in which the polymerization continues outside of the radiation field, takes place causing an additional pressure reduction in the reaction vessel.

This strong post-irradiation effect in the ethylene-$SO_2$-CO polymerization system appears to be quite unique and indicates a relatively long-lived species (free radical or ionic) which can propagate the chain reaction to completion. From a manufacturing point of view, this can make the system economically very attractive.

The radiation energy deposited inside the reaction vessel is measured by using a Fricke dosimeter. Excess gas is vented and the polymer, in the form of a white hard solid product or a more powdery-like material is recovered.

From an industrial application point of view, the use of electron machine radiation may be preferable to Co-60 gamma radiation. The obtention of terpolymers with the use of electron beam radiation machines, something which has never been done before, in high pressure gas systems compares favorably with Cobalt-60 gamma radiation polymerization. A Dynamitron electron accelerator producing electron radiation up to 3 MeV energy was used for the copolymerization experiments. Since this electron machine was limited in energy, an electron linear accelerator (E-Linac) was also used, which delivers electrons to a maximum energy of 10 MeV.

Also, in industrial applications additional cooling may be necessary as the formation of large amounts of polymer may impede heat transfer through the vessel wall.

The reaction vessels utilized with electron beam radiation may similarly be made of stainless steel tubing up to ¾ inch outer diameter by about 13 inches long. They are mounted horizontally and provided with one (or two in the case of the ¾ inch O.D. reaction tubes) ¼ inch O.D. (outer diameter) stainless steel tubes either brazed or cemented to the rear of the reaction tubes along the full length, to provide cooling of the reaction vessels. Cyanoacrylate cement with metal powder provided sufficient heat transfer to maintain the vessels very close to the cooling water temperature of about 10°–20° C. There is a need to limit the wall thickness to allow the electrons to penetrate the wall and deposit energy in the gas phase at a given pressure. Accordingly, the thin walled (0.035 to 0.049 in.) reaction tubes were found to be preferable because of more efficient utilization of electron energy. The total energy collected by the vessel is determined by the current collected by the reaction vessel and the electron energy impinging on the vessel. Energy loss in the walls of larger tubes due to curvature can be minimized by the use of a narrow beam scanning only along the tube axis, or by the use of staggered tubes. Utilization efficiencies of 37 and 46% were calculated on this basis for 1 and 2 inch O.D. titanium tubes, having a wall thickness of 0.025 and 0.050 inches, respectively. Stainless steel tubes of ½ to 2 inches outer diameter have been found to be considerably less efficient than the titanium tubes.

In addition to direct electron energy deposition in the gaseous reactants x-rays are deposited due to the interaction of the high energy electrons with the vessel walls. The following is a description and estimate of this radiation source.

Energy for ionization, which produces free radicals in the monomer mixture, is imparted by the electrons in the electron beam during stepwise ionizing collisions with atomic electrons. The energetic free electrons also lose energy during passage through the electric field of a nucleus, which results in x-rays. Those x-rays appear as a continuous spectrum and, as with gamma rays, undergo a reduction in intensity by photoelectric absorption, Compton scattering, and electron-positron pair formation, all of which also contribute to free radical formation. The electron energy loss per unit length by radiation or x-ray $(dE/dx)_{rad}$ as compared to the energy loss by ionizing collision per unit length $(dE/dx)_{ioniz}$ is given by $$\frac{(dE/dx)_{rad}}{(dE/dx)_{ioniz}} = \frac{EZ}{800},$$

where E is the electron energy in MeV and Z is the atomic number of the absorber.

Some of the electron energy is thus converted into radiation (x-rays) during passage through the vessel wall. This conversion was estimated for a thin walled vessel by the above equation (letting $dE=\Delta E$ and $dx=\Delta x$). The energy distribution after attenuation of the primary electron beam in a vertical 0.035 in. thick steel wall, assuming $2\pi(180°)$ forward scattering of x-ray and also $2\pi$ backscattering of x-ray from a rear parallel wall of the same thickness is thus:

| E, MeV | % x-rays | % Electrons |
|---|---|---|
| 2 | 11 | 89 |
| 4 | 5 | 95 |
| 10 | 3 | 97 |

Attenuation of the x-rays in the steel wall was neglected but would probably be offset by additional scattering of x-rays from the upper and lower portion of the vessel wall for a tube-shaped vessel. These values indicate that for thin walled steel tubing (0.035 in.) with electron energy greater than 2 MeV only a small fraction of the energy is converted into x-rays. Larger x-ray fraction may be obtained with thicker walled vessels.

The conversion of electron energy into x-rays results in a lower energy utilization efficiency of the electron beam compared with efficiencies of up to 40 to 50% that can be achieved with optimum design of thin-walled vessels made of less dense materials such as titanium and aluminum that permit penetration of electrons through the wall and deposition of electron energy directly in the gaseous reactants.

The following examples are merely illustrative of instant invention, but it is not intended to be limited thereto.

EXAMPLE 1

$SO_2$ gas from a gas cylinder is charged to an evacuated and chilled reaction vessel made of stainless steel tubing measuring ½ inch O.D. by 13 inches long, 10½ inches of which extends directly in the radiation field, connected to a pressure gauge by means of a ¼ inch connecting line containing a rupture disc assembly and a tee with a valve for filling and venting. Compression-type fittings were used on the reaction tubes, and cone and threaded high pressure fittings were used elsewhere. The reaction vessel containing the $SO_2$ is charged with an ethylene-CO mixture containing 48.8% CO to a pressure of 170 atmospheres, by means of a stainless steel diaphragm compressor. The reaction vessel is transferred to the gamma pool for equilibrating with the pool water temperature maintained at 10°–13° C., and then inserted into a Co-60 source of radiation.

There was an initial reduction in pressure to about 150 atmospheres as shown by Runs 32, 33 and 67 in Table I.

Variations in the total radiation dose of Co-60 gamma rays, in the amounts of $SO_2$, in the exposure times to the gamma rays and in the intensities of radiation, affect the yield of terpolymer, the overall yield rate and the molecular weight of the end product as shown in Table I.

After each run, excess gas is vented and the terpolymer in the form of a solid product is recovered from the reaction vessel.

EXAMPLE 2

Runs 72, 73 and 74 were prepared in accordance with the method described in Example 1, except that a high pressure, thick-walled 2 inch O.D. by 1 inch I.D. (inner diameter) by 11 inch long Inconel vessel was substituted for the ½ inch O.D. stainless steel tubing. This reaction vessel had considerably thicker walls, i.e. 0.5 inches, as compared to the 0.035 inch wall of the reaction vessels used in Example 1. The reaction vessel containing the $SO_2$ was charged with the same mixture of ethylene and CO to a pressure of 680 atmospheres. The pressure increased 20 to 60 atmospheres rapidly, within 4 to 5 minutes, and then leveled off.

EXAMPLE 3

Run 37 was prepared in a ½ inch O.D. by 13 inch long stainless steel reaction vessel having a wall thickness of 0.035 inches, cooled by means of a ¼ inch O.D. stainless steel tube brazed or cemented to the rear of said reaction vessel along the full length, within which circulates cool water at a temperature of 10°–20° C. The reaction tubes are connected to the interconnecting lines with compression fittings. The cooled reaction vessels are mounted horizontally and provided with a valve, rupture disc assembly and a pressure gauge.

$SO_2$ gas is charged to the evacuated reaction vessel. A mixture of ethylene and CO containing 48.8% CO is charged to the $SO_2$ containing reaction vessel to a pressure of 170 atmospheres. There is an initial reduction in pressure to about 150 atmospheres.

A Dynamitron, a D.C. accelerator, which generates an electron beam of continuous intensity of 2 MeV (million electron volts) is directed at the front of said reaction tube for ½ hour, providing a total radiation dose of 3.20 megarads. A magnetic scanning device spreads the beam over the 13 inch long tube.

Although the Dynamitron was utilized as the source of electron beam radiation, other machines capable of delivering an electron beam is contemplated, such as a microwave linear accelerator-type which generates a pulsed beam at energies up to 10 MeV. The beam pulse length and pulse repetitions per second can be varied. This accelerator is also provided with a magnetic beam spreader. Placement of the reaction tubes three feet away from the beam port resulted in spread of the beam over the 13 inch long tubes, with a dose distribution ranging from zero at the ends of the tube to a maximum at the center.

a large quantity of $SO_2$ was used (9.0 g). This corresponds to an overall G value (number of molecules reacted per 100 electron volts of energy absorbed by the reaction mixture) of $2.6 \times 10^4$ molecules/100 eV, assuming an average polymer unit molecular weight of 43.2 based on earlier ethylene-$SO_2$ analyses which indicated a slightly less than 1/1 $SO_2$/ethylene molar ratio. The lowest yield (0.126 g) and G value ($1.2 \times 10^2$ molecules/100 eV) occurred in Run 37, which was the only electron beam run in this series. This effect may possibly be due to the electron beam interacting with the pressure vessel and/or the high radiation intensity of the electron beam.

Runs 72 through 74 were made with $SO_2$ in the vapor phase only and pressurized with the same ethylene-CO mixture to 680 atm in the larger 2 in. O.D. Inconel reaction vessel. In each of the three runs a rapid pressure increase of 20 to 60 atm occurred within 4 to 5 minutes, which was apparently caused by a large exotherm. In addition, a post-irradiation effect was observed in Run 74, possibly because of the short irradiation period. The pressure in this run rose from 599 atm initially to a peak of 660 atm after a 5 min. irradiation period. After an additional 8 min., the pressure leveled off at 575 atm. The tabulated pressures indicate the initial and final values only. The maximum yield of 3.18

TABLE I
TERPOLYMERIZATION OF ETHYLENE WITH $SO_2$ AND CO EXPERIMENTAL RESULTS

| Run No. | $SO_2$ weight, g | Vessel size, in. O.D. | Wall | Type of radiation | Pressure, atm | Intensity, Mrad/hr | Time, hr | Dose, Mrad | Product weight, g | Overall rate, Q, g/l-hr | Overall G value,[b] molecules/ 100 eV |
|---|---|---|---|---|---|---|---|---|---|---|---|
| 32[c] | 1.5 | ½ | 0.035 | $Co^{60}$ | 146 | 0.60 | 2.00 | 1.20 | 1.504 | 30.1 | $3.7 \times 10^3$ |
| 33[c] | 1.7 | " | " | $Co^{60}$ | 144 | 0.60 | 0.50 | 0.30 | 1.535 | 127 | $1.6 \times 10^4$ |
| 37[c] | 1.5 | " | " | electron[a] | 154 | 6.40 | 0.50 | 3.20 | 0.126 | 8.1 | $1.2 \times 10^2$ |
| 67[c] | 9.0 | " | " | $Co^{60}$ | 147 | 0.90 | 0.50 | 0.45 | 6.40 | 512 | $2.6 \times 10^4$ |
| 72[d] | 1.4 | 2 | 0.500 | $Co^{60}$ | 578–554 | 0.60 | 0.42 | 0.25 | 1.40 | 30.3 | $2.7 \times 10^3$ |
| 73[d] | 1.2 | 2 | " | $Co^{60}$ | 626–599 | 0.60 | 3.00 | 1.80 | 1.92 | 5.8 | $5.1 \times 10^2$ |
| 74[d] | 1.3 | 2 | " | $Co^{60}$ | 599–575 | 0.60 | 0.083 | 0.05 | 3.18 | 347 | $3.0 \times 10^4$ |

General notes:
Temperature: 10° to 13° C.
Reaction vessel volume for ½ in. O.D.: 30.9 cm³  2 in. O.D.: 110 cm³
Additional volume of gauge, lines, and rupture disc: ~20cm³.
[a]2 MeV electron beam at Dynamitron, BNL.
[b]Molecular weight of average polymer unit assumed to be 43.2.
[c]Liquid and gaseous $SO_2$ phase present in vessel.
[d]Only gas phase present.

The terpolymerization of ethylene with $SO_2$ and CO under different experimental conditions, and results thereof are given in Table I. Runs 32, 33, 37, and 67 were made in ½ in. outer diameter (O.D.) reaction vessels containing $SO_2$ in both the liquid and gas phases. After charging with $SO_2$ the vessels were pressurized to 170 atm with an ethylene-CO mixture containing 48.8% CO. Reduction in pressure to approximately 150 atm resulted initially because of solubility of the ethylene-CO gas mixture in liquid $SO_2$ and also because of the lower temperature (10°–13° C.) during irradiation. The highest yield of 6.4 g was obtained in Run 67, in which g of product and G value of $3.0 \times 10^4$ molecules/100 eV in Run 74 compared with runs 72 and 73 indicated that the yield is decreased by increasing irradiation periods longer than 5 minutes.

TABLE II
ETHYLENE-$SO_2$-CO TERPOLYMER ANALYSES

| Run No. | wt % C | wt % H | wt % S | wt % O[a] | M % $C_2H_4$ | M % $SO_2$ | M % CO |
|---|---|---|---|---|---|---|---|
| 32 | 27.49 | 4.74 | 33.05 | 34.23 | 49.9 | 46.5 | 3.6 |
| 33 | 25.85 | 4.51 | 33.95 | 34.26 | 49.7 | 49.4 | 0.9 |
| 37 | 41.1 | 5.68 | 23.65 | 29.57 | 58.0 | 28.0 | 14.0 |
| 67 G[c] | 25.2 | 4.17 | 32.3 | 38.3 | 38.7 | 44.9 | 16.4 |
| 67 L[d] | 26.0 | 4.56 | 30.58 | 38.9 | 36.1 | 41.7 | 22.2 |

[a]Oxygen determined by difference.
[c]Gas phase sample from run 67.
[d]Liquid phase sample from run 67.

The analyses of product from some of the runs are given in Table II. The $SO_2/C_2H_4$ molar ratio is close to 1:1 in runs 32, 33, and 67, and approximately 1:2 in Run 37. The CO concentration is the lowest of the three components with a range between 0.9 and 22.2 mol%. Run 67 is of interest from a conservation viewpoint because of its low ethylene concentration (36.1 and 38.7 mol%). A hard, solid product mass was removed from the bottom of the vessel ($SO_2$ liquid phase) from Run 67 and a more powdery-like material from Run 73.

The infrared spectrum for $C_2H_4$—$SO_2$—SO terpolymer and $C_2H_4$—$SO_2$ polymer are quite similar except for the carbonyl absorption band at about 1700 cm$^{-1}$ (5.8–5.9μ) in the $C_2H_4$—$SO_2$—CO spectrum. This band, of course, is quite pronounced in the $C_2H_4$—CO polymer spectrum.

Thus the evidence of chemical analysis and the infrared spectrum strongly indicates a terpolymerization in the $C_2H_4$—$SO_2$—CO system. Also visual inspection of the terpolymer showed it to be entirely different and the sample was also more cohesive than the powders formed by the other groups.

Characterization was made on the thermal stability of the copolymers—both Differential Scanning Calorimetry (DSC) which essentially determines energy associated with a phase transition, such as melting, and thermogravimetric (TGA) and differential thermogravimetric analysis (DTGA) measurements were made up through decomposition temperatures. TGA and DTGA indicates decomposition due to weight loss. A summary of the data obtained from the DSC and TGA peaks are given in Table III. Generally, the thermal stability for all these copolymers are found to be very high (275°–300° C.) with the peak decomposition rates stretching up to 420° C. Melting seems to occur for the $C_2H_4$—CO at 190° C. and the terpolymer higher, up to 220° C. Discs have been pressed at elevated temperatures with varying degrees of transparency. Generally the discs were somewhat transparent but hard and brittle.

TABLE III

THERMAL CHARACTERISTICS OF THE COPOLYMERS

| Copolymer | Composition | DSC[1] °C. | TGA[2] °C. | DTGA[3] °C. |
|---|---|---|---|---|
| $C_2H_4$—CO | 50–50 | 190 | 275 | 420 |
| $C_2H_4$—$SO_2$ | 50–50 | 155 | 300 | 385 |
| $C_2H_4$—$SO_2$—CO | 36-42-22 | 220 | 280 | 375 |

[1]peak melting or transition
[2]onset of decomposition
[3]peak decomposition

In conclusion, the ethylene appears to form a terpolymer with $SO_2$ and CO based on elemental and IR analytical evidence. The molar content of ethylene can be as low as 36%, the remainder being CO and $SO_2$. The polymerization rates are much higher than with ethylene and CO alone and are, in general, comparable to the rates with ethylene and $SO_2$. According to thermogravimetric analysis, the $C_2H_4$—CO—$SO_2$ terpolymer is stable to 280° C. Optimum conditions of irradiation appear to be a total dose of 0.05 to 0.50 megarads, for a period of 5 minutes to ½ hour at an intensity of 0.6–0.9 megarads/hour. However, greater doses of radiation up to 3.2 and radiation intensities up to 6.4 megarads/hour can also be used in instant invention. Similarly, the time of exposure to radiation can be extended to 3 hours.

It has also been found that the larger quantities of $SO_2$ reactant result in greater yields of product as well as in a greater number of molecules reacted per 100 eV.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

We claim:

1. High molecular weight solid terpolymer of ethylene, sulfur dioxide and carbon monoxide, stable to 280° C., containing as little as 36 mol% ethylene units and about 41–51 mol% sulfur dioxide units, prepared by the irradiation of a liquid and gaseous mixture of ethylene, carbon monoxide and sulfur dioxide, at a temperature of about 10°–50° C., to initiate polymerization, and allowing the polymerization to proceed to its conclusion outside said radiation field.

2. A method of preparing a solid terpolymer of ethylene, sulfur dioxide and carbon dioxide which comprises subjecting a liquid and gaseous mixture of said components to irradiation by means of Cobalt-60 gamma rays or an electron beam, at a temperature of about 10°–50° C., and at a pressure of about 140–680 atmospheres for a period of about 5 minutes to 3 hours, in an environment substantially free of contaminants, to initiate and complete polymerization.

3. A method in accordance with claim 2, wherein the mixture of said components is subjected to a radiation dose of about 0.05 to 3.2 megarads at a radiation intensity rate of about 0.6 to 6.4 megarads per hour.

4. A method in accordance with claim 2, wherein said mixture is subjected to a total radiation dose of about 0.05 to 0.5 megarads for a period of about 5 minutes to ½ hour, at a radiation intensity rate of 0.6–0.9 megarads per hour.

5. A method in accordance with claim 4, wherein polymerization is initiated by said radiation dose and continues to its conclusion outside said radiation field.

6. A method in accordance with claim 2, wherein irradiation with Co-60 gamma rays is conducted at 10°–13° C.

7. A method in accordance with claim 2, wherein irradiation with an electron beam is conducted at a temperature of 10°–20° C.

8. A terpolymer prepared in accordance with the method of claim 2, consisting of the polymerization product of 36 mol % ethylene, 42 mol% sulfur dioxide and 22 mol % carbon monoxide.

* * * * *